(12) United States Patent
Chang et al.

(10) Patent No.: US 7,197,076 B2
(45) Date of Patent: Mar. 27, 2007

(54) METHOD FOR LOCATING PARTITIONS OF A VIDEO IMAGE

(75) Inventors: Chih-Feng Chang, Hsinchu (TW); Chun-Wen Hsu, Hsinchu (TW)

(73) Assignee: An Lnternet Products & Technology Company, Hsinchu (TW)

( * ) Notice: Subject to any disclaimer, the term of this patent is extended or adjusted under 35 U.S.C. 154(b) by 108 days.

(21) Appl. No.: 10/905,769

(22) Filed: Jan. 20, 2005

(65) Prior Publication Data

US 2006/0104362 A1     May 18, 2006

(30) Foreign Application Priority Data

Nov. 16, 2004    (TW) .............................. 93135038 A

(51) Int. Cl.
    *H04N 7/18*      (2006.01)
(52) U.S. Cl. .............................. 375/240.17; 375/240.24

(58) Field of Classification Search ................
                                                     375/240.11–240.29
See application file for complete search history.

(56) References Cited

U.S. PATENT DOCUMENTS 6,990,151 B2 *    1/2006    Kim et al. ............. 375/240.27

* cited by examiner

*Primary Examiner*—Andy Rao
(74) *Attorney, Agent, or Firm*—Jianq Chyun IP Office

(57) ABSTRACT

A method for locating partitions of a video image is provided. The method is used to simplify the process of obtaining the related information of neighboring partitions during the coding and decoding process for the video image. The method starts by mapping the storage units of a matrix to adjacent sub-blocks of a video image. The related information of the partitions is stored in the corresponding storage units. The related information of the neighboring partitions is obtained according to the relative locations of the storage units and the mapping relationship between the storage units and the sub-blocks.

14 Claims, 5 Drawing Sheets

|   |   |   |   |   |
|---|---|---|---|---|
| 0 | 1 | 2 | 3 | 4 |
| 5 | 6 | 7 | 8 | 9 |
| 10 | 11 | 12 | 13 | 14 |
| 15 | 16 | 17 | 18 | 19 |
| 20 | 21 | 22 | 23 | 24 |

|   |   |   |   |   |   |
|---|---|---|---|---|---|
| 0 | 1 | 2 | 3 | 4 | 5 |
| 6 | 7 | 8 | 9 | 10 | 11 |
| 12 | 13 | 14 | 15 | 16 | 17 |
| 18 | 19 | 20 | 21 | 22 | 23 |
| 24 | 25 | 26 | 27 | 28 | 29 |

METHOD FOR LOCATING PARTITIONS OF A VIDEO IMAGE

CROSS-REFERENCE TO RELATED APPLICATION

This application claims the priority benefit of Taiwan application serial no. 93135038, filed on Nov. 16, 2004.

BACKGROUND OF THE INVENTION

1. Field of the Invention

The present invention relates to a method for simplifying a process of obtaining the related information of neighboring partitions of the video image during a coding and decoding process, and more particularly to a method for simplifying a process of obtaining the related information of neighboring partitions of the video image by using a matrix data structure.

2. Description of the Related Art

Traditional motion picture expert group (MPEG) video image compression technology uses a macro-block as a unit in the coding and decoding process. In a new technology, such as advanced video coding (AVC) technology and H. 264 technology, a partition divided from the macro-block can serve as a unit. A video image can be divided into macro-blocks. The basic unit of a macro-block is a sub-block. A partition is an assembly of any number of sub-blocks. FIG. 1 is a configuration showing the relationship between a macro-block 101 and sub-blocks 102. In FIG. 1, the macro-block 101 comprises 16 sub-blocks. FIG. 2 is a configuration showing an example of dividing macro-block 101. The macro-block 101 in FIG. 2 is divided into 5 partitions. Wherein, the partition 110 comprises 8 sub-blocks, the partition 111 comprises 4 sub-blocks, the partition 112 comprises 2 sub-blocks, and each of the partitions 113 and 114 comprises only one sub-block.

During the coding and decoding process for the partitions, the related information of the neighboring partitions may be used. The related information comprises, for example, a non-zero coefficient, an intra predict mode, a reference frame index, a motion vector, and so on. Each macro-block is divided in a different manner so that a complicated data structure is required to describe all possible structures. Accordingly, in the traditional method, various determinations need to be performed in such complicated data structure. For example, in FIG. 2, the partition 110 is adjacent to the left of the partition 114, the partition 113 is adjacent to the top of the partition 114, and the partition 112 is adjacent to the top-right of the partition 114. These partitions have different sizes and shapes. Also, the relative locations of the partitions and the macro-blocks containing these partitions are also different. For locating the partition in other macro-blocks, such as the partition adjacent to the top-right of the partition 112, the procedure will be more complicated. Accordingly, the determination process of the traditional method is complicated, and thus the execution efficiency declines and the programming is difficult.

Accordingly, a method to resolve the issues describe above is desired.

SUMMARY OF THE INVENTION

Accordingly, the present invention is directed to a method for locating partitions of a video image to resolve the prior art disadvantages. During the coding and decoding processes for the video image, the related information of the neighboring partitions can be easily accessed. The determination process is thus simplified. The program is also simplified and the program efficiency is improved.

In order to achieve the object described above and the other objects, the present invention provides a method for locating partitions of a video image. The method starts by mapping each of the storage units of a matrix to one of the neighboring sub-blocks in a video image. The related information of a partition containing the sub-block to which the storage unit corresponds is stored in the storage unit. Finally, the related information of the neighboring partitions adjacent to each partition are obtained according to relative locations of the storage units in the matrix and a mapping relationship between the storage units and the sub-blocks.

In the method for locating the partitions of a video image according to an embodiment of the present invention, the related information comprises a non-zero coefficient, an intra predict mode, a reference frame index, and a motion vector of a partition.

According to the preferred embodiments of the present invention, the present invention uses a matrix composed of plural storage units. Each storage unit corresponds to one of the sub-blocks of the macro-block. The related information of the partitions is stored in the storage units corresponding to the sub-blocks of the partitions. Since the sub-blocks have the same size and are orderly arranged, no matter how the partitions are divided, the related information of the neighboring partitions can be obtained by performing simple algebra on the indexes of the storage units. The method of the present invention doesn't have to search the neighboring partitions in a complicated data structure as the conventional technology does. Therefore, the conventional complicated determination process can be simplified. The program design is also simplified and the program efficiency can be improved.

The above and other features of the present invention will be better understood from the following detailed description of the preferred embodiments of the invention that is provided in communication with the accompanying drawings.

BRIEF DESCRIPTION OF THE DRAWINGS

FIG. 3 is a configuration showing a matrix with five columns and five rows, with a total of 25 storage units according to one embodiment of the present invention.

FIG. 5 is a configuration showing a matrix with six columns and five rows, with a total of 30 storage units according to one embodiment of the present invention.

DESCRIPTION OF SOME EMBODIMENTS

The present invention uses a matrix composed of multiple storage units. Each storage unit corresponds to one of the sub-blocks of the video image. The related information of the partitions is stored in the storage units corresponding to their sub-blocks. The sub-blocks have the same size and are orderly arranged. Accordingly, the conventional complicated determination process can be simplified as index algebra of the storage units. The following is a description of a method for locating partitions of a video image according to an embodiment of the present invention.

Figure 1:
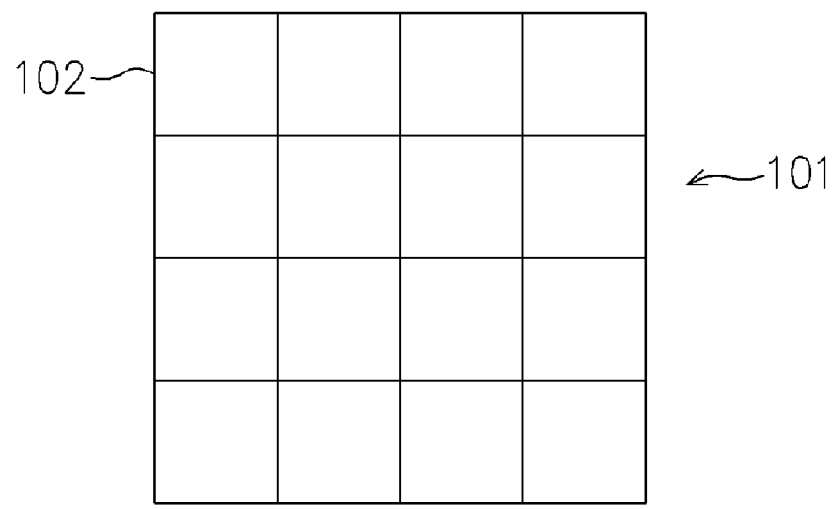
FIG. 1 is a configuration showing the relationship between a macro-block and its sub-blocks.
Figure 2:
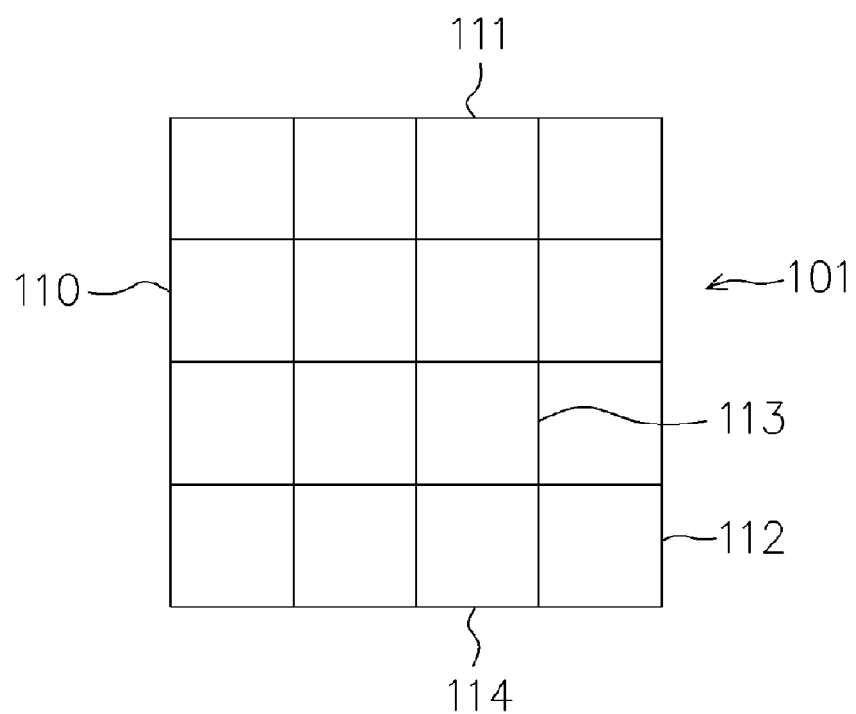
FIG. 2 is a configuration showing the relationship between a macro-block and its partitions.

FIG. 3 is a configuration showing a matrix 301 with five columns and five rows, a total of 25 storage units. As shown in FIG. 3, the index of the top-left corner storage unit is 0. The indexes of the storage units increments first along the row and then along the column. The index of the bottom-right corner storage unit is 24. The macro-block of this embodiment comprises 16 sub-blocks as shown in FIG. 1. Accordingly, the matrix 301 is sufficient to cover all sub-blocks of the macro-block for a coding or decoding operation. The following is a description of the mapping relationship between the storage units of the matrix 301 and the sub-blocks. The storage unit with index 0 at the intersection of the first column and the first row of the matrix 301 corresponds to the sub-block at the top-left corner. The sub-blocks corresponding to the second row of the matrix 301 are adjacent to the bottom of the sub-blocks corresponding to the first row, and the sub-blocks corresponding to the second column are adjacent to the right of the sub-blocks corresponding to the first column, and so on. The bottom-right 16 storage units of the matrix 301 correspond to the macro-block to be coded or decoded. The storage units in the first column and the first row correspond to the sub-blocks of the neighboring partitions adjacent to the left and the top of the macro-block.

Figure 4A:
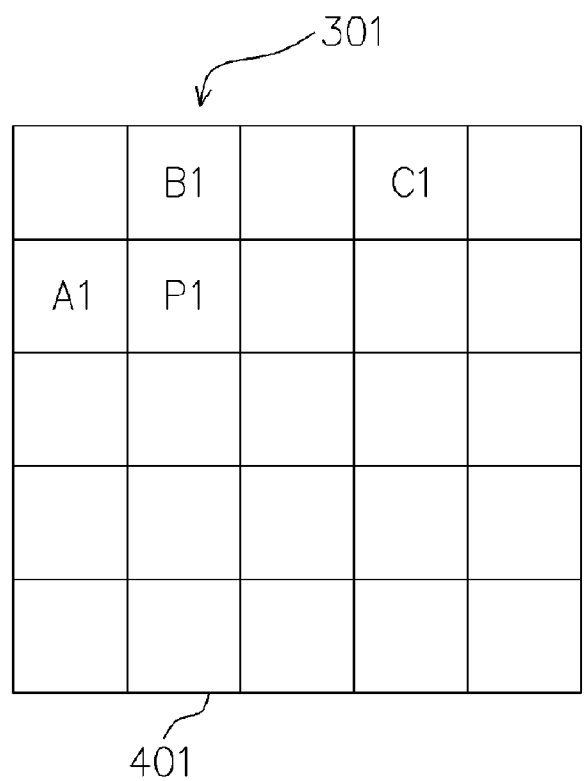
FIGS. 4A and 4B are configurations showing how an embodiment of the present invention uses the matrix in FIG. 3.
Figure 4B:
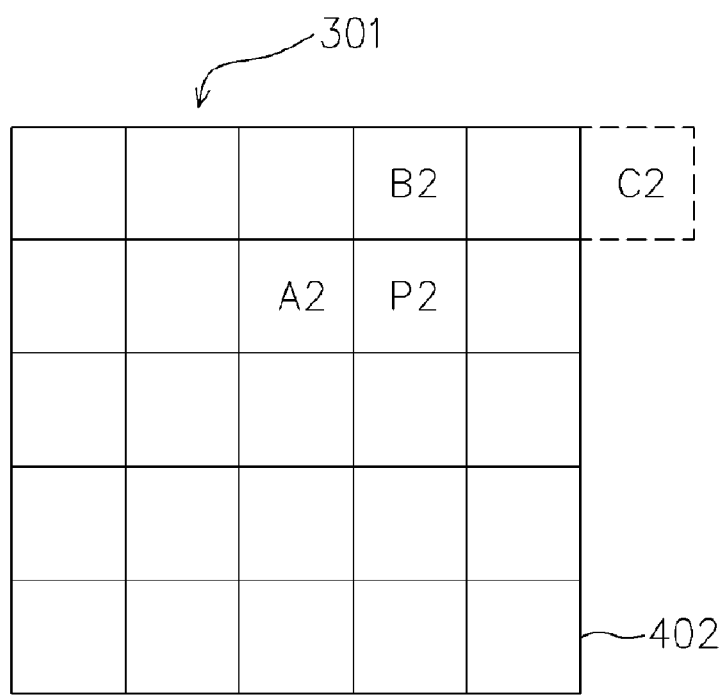

FIGS. 4A and 4B are configurations showing how to obtain related information of the neighboring partitions using the matrix 301. Referring to FIG. 4A, in this embodiment, when a macro-block is divided, the related information of all partitions of the macro-block is stored in the storage units corresponding to the sub-blocks of the partitions. For example, each of the 8 sub-blocks of the partition 401 in FIG. 4A stores the same related information from partition 401. The data stored in the storage units in the first column and the first row of the matrix 301, i.e., the related information of the neighboring partitions adjacent to the left and the top of the macro-block, come from a cache buffer. The cache buffer will be discussed with more details in the following.

In a coding and decoding process for a partition, the related information of the partitions neighboring the left and the top of the above partition is most frequently used, followed by the related information of the top-right neighboring partition. Referring to FIG. 4A, in this embodiment, the sub-block at the top-left corner of the partition serves as the base location for obtaining the related information of the neighboring partitions, such as the sub-block P1 of the partition 401. Actually, any one of the sub-blocks may serve as the base location without affecting the advantages of the present invention. As shown in FIG. 4A, by accessing the related information stored in the storage unit corresponding to the sub-block A1, the related information of the left partition next to the partition 401 can be obtained. The index of A1 is the index of P1 minus 1. Similarly, by accessing the related information stored in the storage unit corresponding to the sub-block B1, the related information of the top partition next to the partition 401 can be obtained. The index of B1 is the index of P1 minus the number of columns in the matrix 301. The number of the columns of the matrix 301 is 5 in this embodiment. Similarly, by accessing the related information stored in the storage unit corresponding to the sub-block C1, the related information of the top-right partition next to the partition 401 can be obtained. The index of C1 is the index of P1 minus the number of columns of the matrix 301, i.e., 5 in this embodiment, and plus the width of the partition 401, i.e., 2 in this embodiment. As demonstrated above, by simple index algebra, the related information of the neighboring partitions can be easily acquired.

The disadvantage of this embodiment is that it is possible the top-right sub-block next to the partition goes beyond the scope of the matrix 301. For example, the sub-block P2 serves as the base location for the partition 402 in FIG. 4B. The sub-block A2 on the left and the sub-block B2 on the top are within the scope, but the sub-block C2 on the top right corner goes beyond the scope of the matrix 301. One approach to locate the neighboring partition containing the sub-block C2 is the conventional method. If the index of the sub-block C2 is 5, the partition containing C2 has to be located in the neighboring macro-block adjacent to the top-right of the partition 402. If the index of the sub-block C2 is larger than 5 and is a multiple of 5, the partition containing C2 has to be located in the neighboring macro-block adjacent to the right of the partition 402. Even under this circumstance, the simplified process for locating the sub-blocks A2 and B2 still proves the advantage of the present invention.

In order to resolve the disadvantage where the top-right sub-block next to the partition goes beyond the scope of the matrix, another embodiment of the present invention uses the matrix 501 with 30 storage units, comprising six columns and five rows as shown in FIG. 5. The sixth column corresponds to the neighboring partition adjacent to the top-right of the present partition. The index algebra for the matrix 501 is similar to that for the matrix 301. The only difference is that the number of the columns increases from 5 to 6. Accordingly, by using the matrix 501, the related information of the neighboring partition adjacent to the top-right of the present partition can be readily obtained.

The matrixes of the embodiments above are so limited in size that they only correspond to a portion of the sub-blocks of the video image. In another embodiment of the present invention, a larger matrix is used to correspond to all sub-blocks of the video image. By using this approach, the cache buffer is not required because all the related information is stored in the matrix. This approach, however, needs more memories.

Figure 6:
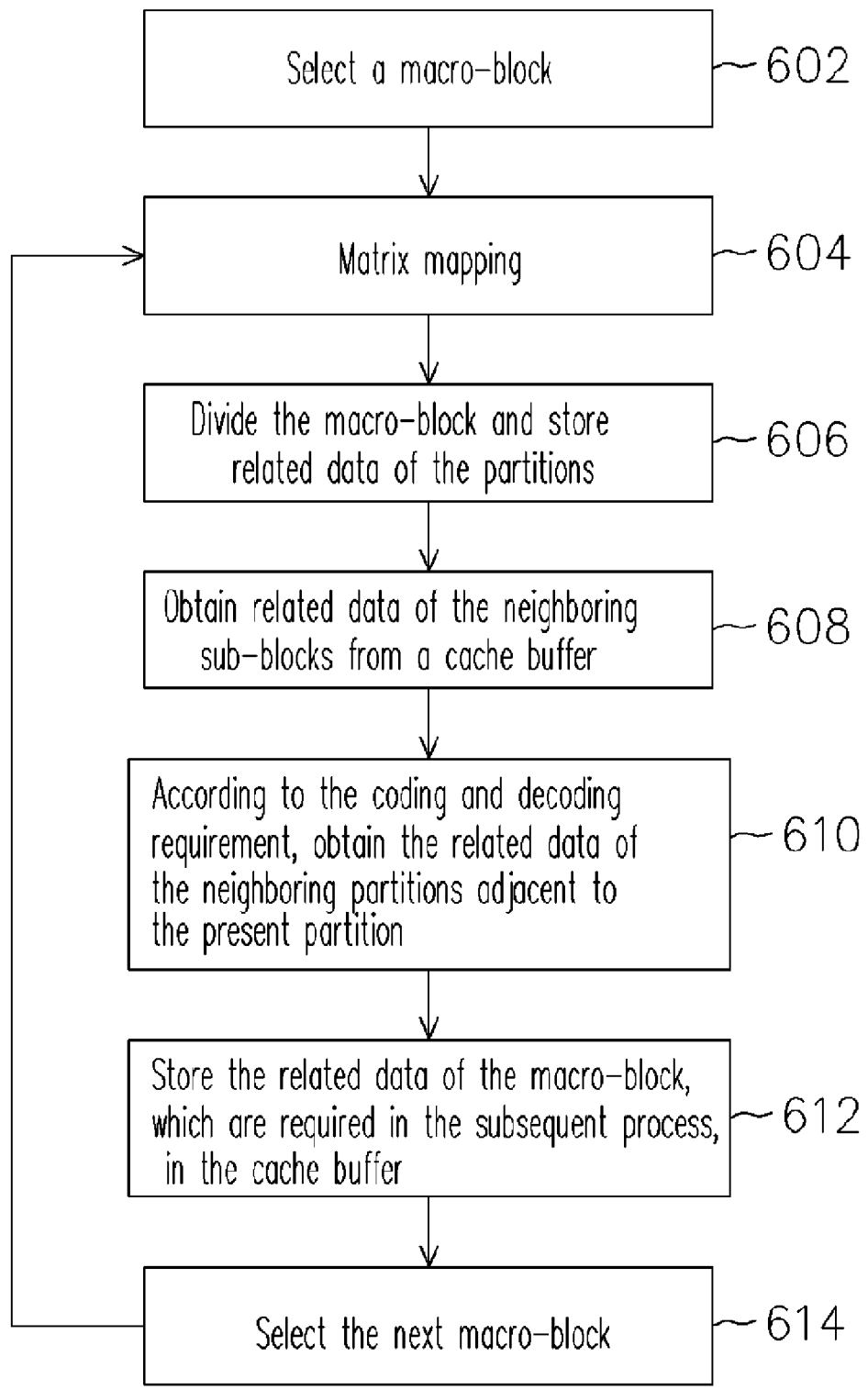
FIG. 6 is a flowchart showing the flow of an embodiment of the present invention.

FIG. 6 is a flowchart showing another embodiment of the present invention. This embodiment uses the matrix 301 in FIG. 3. First, in step 602, a macro-block to be coded or decoded is selected. It can be, for example, a macro-block at the top-left corner of the video image. In step 604, the storage units of the matrix 301 are used to correspond to all sub-blocks of the macro-block, and the sub-blocks neighboring the leftmost column and the top row of the macro-block.

After the mapping process, in step 606, the macro-block is divided into at least one partition. The related information of the partitions is stored in the storage units corresponding to the sub-blocks of the partitions. In this embodiment, the related information comprises a non-zero coefficient, an intra predict mode, a reference frame index, and a motion vector of each partition.

Then, in step 608, the related information of the sub-blocks of the neighboring macro-block is obtained from a cache buffer and the related information is stored in the storage units in the first column and the first row of the matrix 301. The sequence of selecting the macro-blocks is from the top-left corner to the bottom-right corner in a left-to-right-and-top-to-bottom manner. Accordingly, the macro-blocks at the left and the top of a selected macro-block are divided earlier than the current macro-block, and the cache buffer will contain the related information of the neighboring partitions on the left and the top.

In step 610, the coding or decoding operation is performed for each partition of the selected macro-block. According to the relative locations of the storage units of the matrix 301, and the mapping relationship between the storage units and the sub-blocks, the related information of the neighboring partitions of the selected partition, usually including the related information of the partitions adjacent to the left, the top, and the top-right corner of the selected partition, is obtained. The index algebra required to obtain the related information has been described above. Then, in step 612, the related information of the sub-blocks of the selected macro-block, which is needed in subsequent process, is stored in the cache buffer for subsequent use.

Finally, in step 614, the next macro-block to be coded or decoded is selected and the process goes back to step 604. The process is repeated until the whole video image is coded or decoded.

According to the embodiments described above, the present invention uses a matrix composed of multiple storage units. Each storage unit corresponds to one of the sub-blocks of a macro-block. The related information of the partitions is stored in the storage units corresponding to the sub-blocks of the partitions. Since the sub-blocks have the same size and are orderly arranged, regardless to how the macro-block is divided. By applying simple algebra on the indexes of the storage units, the related information of the neighboring partitions can be located without searching for the partitions in a complicated data structure as the prior art does. Therefore, the conventional complicated determination process is simplified. The program design is also simplified and the program efficiency can be improved.

Although the present invention has been described in terms of exemplary embodiments, it is not limited thereto. Rather, the appended claims should be constructed broadly to include other variants and embodiments of the invention which may be made by those skilled in the field of this art without departing from the scope and range of equivalents of the invention.

What is claimed is:

1. A method for locating partitions of a video image, comprising:
    mapping each of a plurality of storage units of a matrix to one of neighboring plural sub-blocks of a video image;
    storing in each of the storage units a related information of a partition to which the corresponding sub-block belongs; and
    obtaining the related information of neighboring partitions adjacent to each of the partitions according to relative locations of the storage units in the matrix and the mapping relationship between the storage units and the sub-blocks; wherein the storage unit at an intersection of a first row and a first column of the matrix corresponds to the sub-block at the top-left corner of the sub-blocks, the sub-blocks corresponding to a second row of the matrix are immediately below the sub-blocks corresponding to the first row of the matrix, and the sub-blocks corresponding to the second column of the matrix are immediately right to the sub-blocks corresponding to the first column of the matrix, and so on.

2. The method for locating partitions of a video image of claim 1, wherein the related information is stored in the storage units when a macro-block containing the partitions corresponding to the related information is divided.

3. The method for locating partitions of a video image of claim 1, wherein the related information comprises a non-zero coefficient, an intra predict mode, a reference frame index, and a motion vector of the partition.

4. The method for locating partitions of a video image of claim 1, wherein each macro-block of the video image is a matrix of 16 sub-blocks.

5. The method for locating partitions of a video image of claim 1, wherein the storage units correspond to all sub-blocks of the video image.

6. The method for locating partitions of a video image of claim 1, wherein the sub-blocks corresponding to the storage units comprise all sub-blocks of a central macro-block, and a plurality of sub-blocks of at least one neighboring macro-block adjacent to the central macro-block.

7. The method for locating partitions of a video image of claim 6, further comprising:
    obtaining the related information of the sub-blocks of the neighboring macro-blocks from a cache buffer, and storing the related information in the corresponding storage units; and
    storing the related information of the sub-blocks of the central macro-block required in a subsequent process in the cache buffer.

8. The method for locating partitions of a video image of claim 6, wherein the sub-blocks of the neighboring macro-blocks comprise a column of sub-blocks neighboring the left of the central macro-block, and a row of sub-blocks neighboring the top of the central macro-block.

9. The method for locating partitions of a video image of claim 6, wherein the sub-blocks of the neighboring macro-blocks comprise a column of sub-blocks neighboring the left of the central macro-block, a row of sub-blocks neighboring the top of the central macro-block, and a column of sub-blocks neighboring the right of the central macro-block.

10. The method for locating partitions of a video image of claim 1, wherein an index of the storage unit at the intersection of the first row and the first column of the matrix is 0, an index of the storage unit at an intersection of the first row and the second column of the matrix is 1, and indexes of the other storage units increments first along the column and then along the row.

11. The method for locating partitions of a video image of claim 10, wherein the sub-block at the top-left corner of a partition serves as a base location in the step of obtaining the related information of the neighboring partitions adjacent to the partition.

12. The method for locating partitions of a video image of claim 11, further comprising:
    when obtaining die related information of a left partition next to a central partition, if the index of the storage unit corresponding to the sub-block at the left-top corner of the partition is n, accessing the related information of the storage unit with the index of n−1.

13. The method for locating partitions of a video image of claim 11, further comprising:
    when obtaining the related information of a top partition next to a central partition, if the index of the storage unit corresponding to the sub-block at the left-top corner of the partition is n, accessing the related information of the storage unit with the index of a minus the number of columns of the matrix.

14. The method for locating partitions of a video image of claim 11, further comprising:
    when obtaining the related information of a top-right partition next to a central partition, if the index of the storage unit corresponding to the sub-block at the left-top corner of the partition is n, accessing the related information of the storage unit with the index n minus the number of columns of the matrix plus the width of the central partition.

* * * * *